US008103426B2

(12) United States Patent
Parisi et al.

(10) Patent No.: US 8,103,426 B2
(45) Date of Patent: Jan. 24, 2012

(54) METHOD FOR CONTROLLING TWO CONSECUTIVE INJECTION PULSES IN AN ELECTRICALLY-ACTUATED FUEL INJECTOR SYSTEM FOR AN INTERNAL COMBUSTION ENGINE, PARTICULARLY A DIESEL ENGINE

(75) Inventors: Filippo Parisi, Turin (IT); Ivan Pelizzoni, Turin (IT); Eugenio Pisoni, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 12/359,832

(22) Filed: Jan. 26, 2009

(65) Prior Publication Data

US 2009/0222195 A1 Sep. 3, 2009

(30) Foreign Application Priority Data

Jan. 28, 2008 (EP) .................................. 08425039

(51) Int. Cl.
*B60T 7/12* (2006.01)
*F02B 3/00* (2006.01)
(52) U.S. Cl. ................. 701/105; 123/294; 123/300
(58) Field of Classification Search .................. 701/103, 701/105; 123/294, 299, 300, 305, 436, 472, 123/481, 491
See application file for complete search history.

(56) References Cited

U.S. PATENT DOCUMENTS

| 4,463,730 | A | * | 8/1984 | Kishi | 123/491 |
|---|---|---|---|---|---|
| 4,467,771 | A | * | 8/1984 | Atago et al. | 123/490 |
| 4,932,379 | A | * | 6/1990 | Tang et al. | 123/436 |
| 4,932,380 | A | * | 6/1990 | Kobayashi et al. | 123/478 |
| 5,076,238 | A | * | 12/1991 | Rosenau et al. | 123/491 |
| 5,611,311 | A | * | 3/1997 | Tomisawa | 123/406.47 |
| 6,382,177 | B1 | | 5/2002 | Saito | |
| 6,491,016 | B1 | | 12/2002 | Buratti | |
| 7,647,919 | B2 | * | 1/2010 | Moller et al. | 123/478 |
| 2003/0089334 | A1 | | 5/2003 | Yomogida | |
| 2007/0215097 | A1 | | 9/2007 | Watanabe | |

FOREIGN PATENT DOCUMENTS

| EP | 1035314 A2 | 9/2000 |
|---|---|---|
| EP | 1077321 A | 2/2001 |
| EP | 1835161 A | 9/2007 |

OTHER PUBLICATIONS

European Search Report dated Jul. 25, 2008, issued in Application No. 08425039.8.

* cited by examiner

*Primary Examiner* — John T Kwon
(74) *Attorney, Agent, or Firm* — Ingrassia Fisher & Lorenz, P.C.

(57) ABSTRACT

At each engine cycle, nearby the TDCC, an injector is driven so as to perform a fuel injection sequence according to a predetermined pattern (A-Z), including a plurality of successive, separate fuel injection pulses (pulse 1-pulse N) having respective predetermined durations. The start of the first injection pulse (Pulse 1) of the sequence is defined as a predetermined angular distance from the TDCC. For each injection pulse (pulse 2-pulse N) following the first one (pulse 1) the respective start is selectively determined either as a time distance from the end of the immediately preceding injection pulse (pulse 1-pulse N−1) or as an angular distance from the relevant TDCC, in dependence on the instantaneous value of at least one predetermined parameter.

6 Claims, 1 Drawing Sheet

METHOD FOR CONTROLLING TWO CONSECUTIVE INJECTION PULSES IN AN ELECTRICALLY-ACTUATED FUEL INJECTOR SYSTEM FOR AN INTERNAL COMBUSTION ENGINE, PARTICULARLY A DIESEL ENGINE

CROSS-REFERENCE TO RELATED APPLICATION

This application claims priority to European Patent Application No. 08425039.8-2311, filed Jan. 28, 2008, which is incorporated herein by reference in its entirety.

TECHNICAL FIELD

The present invention refers to a method for controlling fuel injectors in an internal combustion engine. More specifically, the invention relates to a method for controlling an electrically-actuated fuel injector in a combustion engine, particularly a diesel engine.

According to a method for controlling an electrically-actuated fuel injector in a combustion engine, which is known for instance from EP A 1 035 314, at each engine cycle, nearby the TDCC (Top Dead Compression Centre), an injector is driven so as to perform a fuel injection sequence according to a predetermined pattern dependent on operating conditions of the engine including a plurality of successive, separate fuel injection pulses having respective predetermined durations, and the start of the first injection pulse of the sequence is defined as a predetermined crank angle value with respect to the TDCC.

FIG. 1 of the annexed drawings shows an exemplary pattern of such an injection sequence comprising a generic number N of separate injection pulses. The injection pulses, indicated as pulse 1, pulse 2 . . . pulse N in FIG. 1, can have shorter or longer durations, depending on the engine operating conditions. In FIG. 1, the various pulses of the injection sequence are also indicated with the letters A to Z.

The first pulse, or pulse 1, of the sequence, has a start which is defined as an angular distance from the TDCC. For each injection pulse of the injection sequence following the first one, there are however two possible modes to define the respective starts (i.e., there are basically two possible modes for linking two consecutive pulses).

As shown in the graph of FIG. 2a of the annexed drawings, in a first mode ("time-linked" mode), the start of a generic pulse n of the sequence is determined as a time distance from the end of the immediately preceding injection pulse n–1.

In an injection control method in which the various pulses of a same injection sequence are time-linked with one another, the time distance between two subsequent pulses is guaranteed, however any errors concerning, for instance, the actual duration of each pulse consequently affect the start (and the end) of all subsequent pulses.

Referring to FIG. 2b of the annexed drawings, another manner of defining the start of injection (SOI) of each injection pulse of a given injection sequence is defined by means of the respective angular distance (crank angle) from the relevant TDCC. This "angle-defined" mode of linking the injection pulses avoids the above-outlined inconvenience of the "time-linked" mode, but may create problems in some operating conditions.

In view of the foregoing, at least one object of the present invention is to provide an improved method of the initially defined kind, overcoming the inconveniences of the above-defined modes of linking the injection pulses within a same injection sequence. In addition, other objects, desirable features, and characteristics will become apparent from the subsequent summary and detailed description, and the appended claims, taken in conjunction with the accompanying drawings and this background.

SUMMARY

In the method in accordance with an embodiment of the present invention, for each injection pulse of an injection sequence following the first one, the respective start is selectively determined either (in a first manner) as a time distance from the end of the immediately preceding injection pulse, or (in a second manner) as a angular distance (crank angle) from the relevant TDCC, in dependence on the instantaneous value of at least one predetermined parameter. Thus, with the method of the invention it is possible that the start of each injection pulse following the first one, be determined differently from the preceding one.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
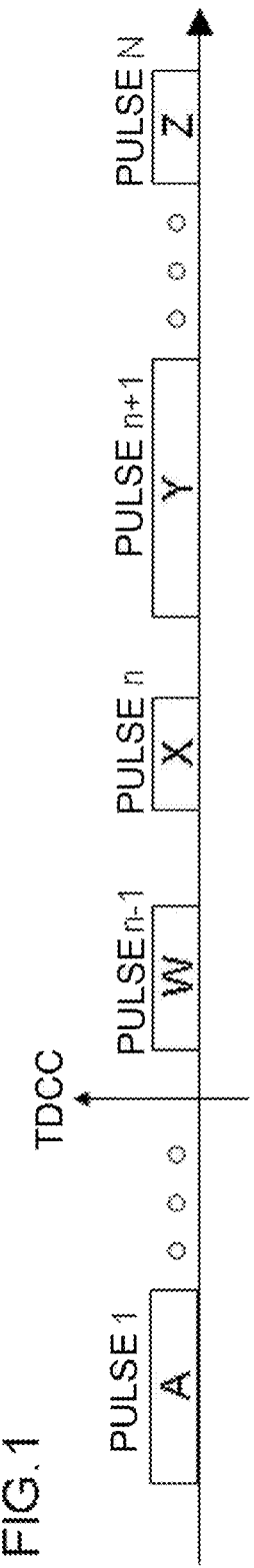
FIG. 1, which has already been described, is a diagrammatic representation of an injection sequence including a generic number of successive, separate injection pulses; and FIG. 2a and FIG. 2b illustrates two different manners of defining the start of each injection pulse, following the first one of a given injection sequence.
Figure 2:
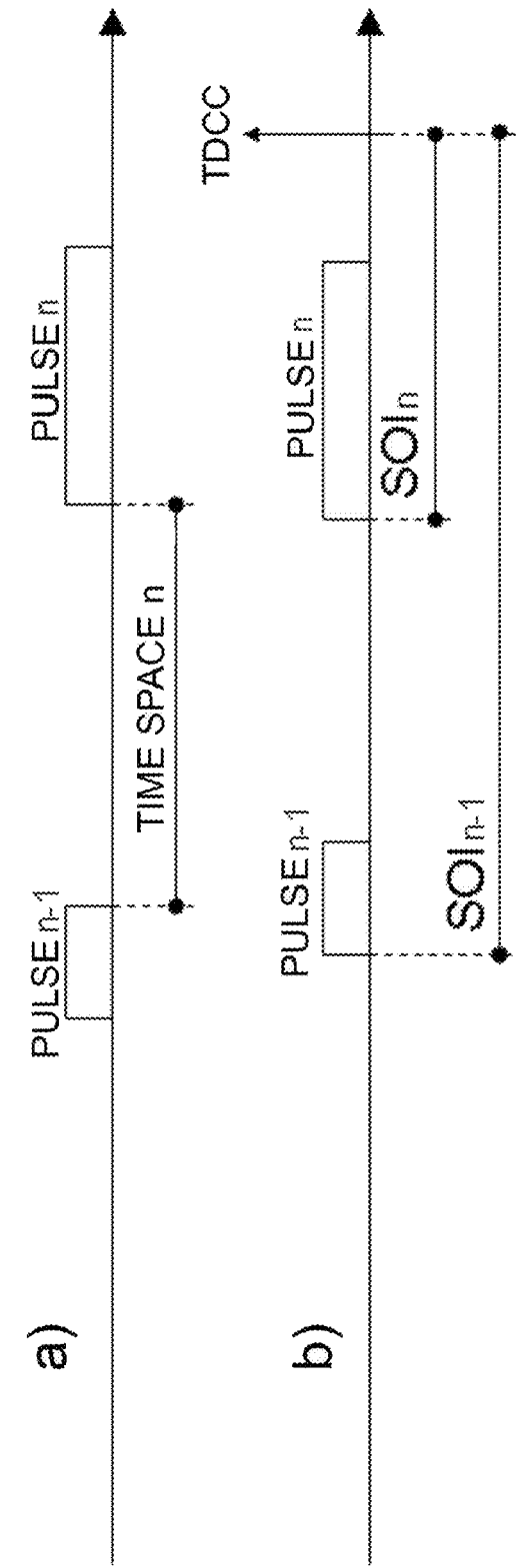

The following detailed description is merely exemplary in nature and is not intended to limit application and uses. Furthermore, there is no intention to be bound by any theory presented in the preceding background or summary or the following detailed description.

In the following, the two above-mentioned manners of defining the start of the injection pulses of a given injection sequence will also be referred to as "time-linked" mode and "angle-defined" mode, respectively. The "angle-defined" mode is also called "independent" mode.

According to an embodiment of the present invention, the start of the first injection pulse of each injection sequence is always determined in accordance with the angle-defined or independent mode. For all the following injection pulses of the same sequence, the respective start is determined on a pulse by pulse basis and in principle could be different from one pulse to the other.

In general, for each pulse the start is determined either in the time-linked or in the angle-defined mode depending on several operating conditions, such as the value of the engine speed or other environmental conditions, the time length of each pulse, the current engine combustion mode (such as normal running, cranking phase, after-treatment mode, etc.), and other external conditions.

According to an embodiment of the present invention however, the start of each injection pulse following the first one is selectively determined in either the first or the second mode, depending on whether its nominal time distance from the immediately preceding injection pulse is smaller than a predetermined threshold value. This threshold value of the time distance is conveniently (though not necessarily) variable in accordance with a predetermined function of the engine speed. In a diesel cycle common-rail engine, said threshold value of the time distance between injection pulses might also be variable as a predetermined function of the fuel pressure in the rail.

Whenever the pattern of an injection sequence to be performed should be different from the pattern of the preceding injection sequence, then it might be advisable that the start of each injection pulse following the first one be determined in accordance with the above-defined time-linked manner or mode.

The method in accordance with embodiments of the present invention allows the determination on a case by case, i.e. pulse by pulse, which is the best manner for defining the respective start. This renders the injection system more efficient, particularly when great variations of the engine conditions occur in a short time.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for controlling two consecutive fuel injection pulses in an electrically-actuated fuel injector system for an internal combustion engine, which nearby the top dead compression centre (TDCC), an injector is driven so as to perform a fuel injection sequence (pulse 1-pulse N) according to a predetermined pattern (A-Z) including a plurality of successive and separate fuel injection pulses (pulse 1-pulse N) having respective predetermined durations, and a start of a first injection pulse (pulse 1) of the fuel injection sequence is defined as an angular distance (crank angle) with respect to the TDCC, the method comprising the steps of:

following the first one (pulse 1) for each injection pulse (pulse 2-pulse N) of the fuel injection sequence;

comparing an instantaneous value of a function of a predetermined parameter with a threshold value;

determining a start in a first manner as a time distance from an end of an immediately preceding injection pulse (pulse 1, . . . , pulse N−1) if said instantaneous value is less than said threshold value; and determining a start in a second manner as the angular distance from a relevant TDCC if said instantaneous value is not less than said threshold value.

2. The method of claim 1, wherein the start of each injection pulse (pulse 2-pulse N) following the first one (pulse 1) is selectively determined in at least one of the first manner or the second manner depending on whether a nominal time distance from the immediately preceding injection pulse (pulse 1, . . . , pulse N−1) is smaller than a predetermined threshold value.

3. The method of claim 2, in which said predetermined threshold value of the time distance is variable in accordance with a predetermined function of an engine speed and an combustion mode activated depending on an engine operating condition.

4. The method according to claim 2, wherein said predetermined threshold value of the time distance is variable as a predetermined function of a fuel pressure.

5. The method according to claim 1, wherein the start of each injection pulse (pulse 2-pulse N) following the first one (pulse 1) is determined in the first manner when a pattern of the fuel injection sequence to be performed is different from a pattern of a preceding injection sequence.

6. The method according to claim 1, wherein the internal combustion engine is a diesel engine.

* * * * *